(12) United States Patent
Beaudoin et al.

(10) Patent No.: US 10,401,247 B2
(45) Date of Patent: *Sep. 3, 2019

(54) DIFFERENTIAL PRESSURE SENSOR ARRANGEMENT FOR AN ENVIRONMENTAL CONTROL SYSTEM

(71) Applicant: Distech Controls Inc, Brossard (CA)

(72) Inventors: Daniel Beaudoin, Chambly (CA); Eric Lapointe, Brossard (CA); Pascal Gratton, Montreal (CA); Steve Lupien, Brossard (CA); Charles Pelletier, St-Jean-sur-Richelieu (CA)

(73) Assignee: DISTECH CONTROLS INC., Brossard, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 15/225,867

(22) Filed: Aug. 2, 2016

(65) Prior Publication Data

US 2018/0038755 A1    Feb. 8, 2018

(51) Int. Cl.
- G01L 27/00 (2006.01)
- G01L 19/00 (2006.01)
- G01L 19/14 (2006.01)

(52) U.S. Cl.
CPC ........ G01L 19/003 (2013.01); G01L 19/0038 (2013.01); G01L 19/147 (2013.01)

(58) Field of Classification Search
CPC . G01L 19/003; G01L 19/0038; G01L 19/147; G01L 11/00; G01L 7/06; G01L 7/00; G01L 27/002; G01L 19/04; G01C 25/00; G02L 37/005; G05D 7/0617

See application file for complete search history.

(56) References Cited

U.S. PATENT DOCUMENTS

| | | | | |
|---|---|---|---|---|
| 4,476,725 A | * | 10/1984 | Chorel | G01L 9/0022 73/704 |
| 4,606,229 A | * | 8/1986 | Spence | G01L 9/14 338/32 H |
| 5,003,825 A | * | 4/1991 | Lew | G01L 9/0013 73/704 |
| 5,231,881 A | * | 8/1993 | Lew | G01L 9/0013 73/704 |

(Continued)

*Primary Examiner* — Harshad R Patel
*Assistant Examiner* — Nigel H Plumb
(74) *Attorney, Agent, or Firm* — RatnerPrestia

(57) ABSTRACT

A system comprising a housing, a printed circuit board and a differential pressure sensor located inside the housing, and first and second male adaptors. The first and second male adaptors respectively extend through first and second openings in the housing. The first male adaptor comprises a proximal end configured to receive a first pipe, a distal end secured to the differential pressure sensor, and an internal fluid conduit for transmitting fluid received from the first pipe to the differential pressure sensor. The second male adaptor comprises a proximal end configured to receive a second pipe, a distal end secured to the differential pressure sensor, and an internal fluid conduit for transmitting fluid received from the second pipe to the differential pressure sensor. The differential pressure sensor is configured to determine a pressure differential between fluid received via the first male connector and fluid received via the second male connector.

16 Claims, 6 Drawing Sheets

(56) References Cited

U.S. PATENT DOCUMENTS

| | | | | |
|---|---|---|---|---|
| 5,804,735 A | * | 9/1998 | Biskup | G01L 13/026 |
| | | | | 73/706 |
| 5,899,962 A | * | 5/1999 | Louwagie | G01F 1/363 |
| | | | | 702/138 |
| 6,134,969 A | * | 10/2000 | Studer | G01L 13/02 |
| | | | | 73/1.16 |
| 9,869,600 B2 | * | 1/2018 | Haldorsen | G01L 13/02 |
| 2002/0095993 A1 | * | 7/2002 | Ferris | G01L 19/0007 |
| | | | | 73/753 |
| 2015/0019022 A1 | * | 1/2015 | Karamanos | G05D 7/0647 |
| | | | | 700/276 |
| 2018/0073952 A1 | * | 3/2018 | Beaudoin | G01L 27/002 |

* cited by examiner

DIFFERENTIAL PRESSURE SENSOR ARRANGEMENT FOR AN ENVIRONMENTAL CONTROL SYSTEM

TECHNICAL FIELD

The present disclosure relates to the field of pressure sensors. More specifically, the present disclosure relates to a system or environment control appliance comprising a separated pressure sensor adapted for determining a pressure differential of a fluid coming from two different locations outside a housing.

BACKGROUND

An environment control system usually comprises a Printed Circuit Board (PCB) hosting a plurality of electronic components. If one of the functionalities of the environment control system relies on determining a pressure of one or more fluids, a pressure sensor is integrated to the environment control system. A common design involves hosting the pressure sensor on the PCB for mechanically supporting and electrically connecting the pressure sensor. With this common design, the pressure sensor receives electrical power directly from the PCB, and can be adapted for transmitting data related to pressure measurements to another electronic component of the PCB.

However, having the pressure sensor hosted by the PCB limits the flexibility for positioning the pressure sensor within the environment control system, since the pressure sensor becomes dependent on the position of the PCB within the environment control appliance. This lack of flexibility in the positioning of the pressure sensor can be a serious drawback in specific configurations.

For example, the environment control system comprises a housing having a front panel and a back panel opposite to the front panel. The front panel of the environment control system comprises one or more controls (e.g. one or more buttons, a touchscreen, etc.) allowing a user to interact with the environment control system, and to control at least some of the electronic components hosted by the PCB. The PCB is positioned in close vicinity of the front panel for facilitating interconnections between the one or more controls and the corresponding controlled electronic components. The one or more fluids which pressure is determined by the pressure sensor are delivered by one or more hoses through the housing. Because the hoses are connected to the pressure sensor inside the housing, it is not possible to visually assess the proper connection of the hoses to the pressure sensor. There is also a risk that one of the hoses disconnects from the pressure sensor and fluid leaks causing reading errors.

SUMMARY

According to a first aspect, the present disclosure provides a system comprising a housing, a differential pressure sensor located inside the housing, and first and second male adaptors. The first male adaptor extends through a first opening in the housing. The first male adaptor comprises a proximal end configured to receive a first pipe, a distal end secured to the differential pressure sensor, and an internal fluid conduit for conveying fluid received from the first pipe to the differential pressure sensor. The second male adaptor extends through a second opening in the housing. The second male adaptor comprises a proximal end configured to receive a second pipe, a distal end secured to the pressure sensor, and an internal fluid conduit for conveying fluid received from the second pipe to the differential pressure sensor. The differential pressure sensor is configured to determine a pressure differential between fluid received via the first male connector and fluid received via the second male connector.

According to a second aspect, the present disclosure provides a system comprising a housing, a differential pressure sensor affixed to the housing, a printed circuit board (PCB) located inside the housing, and first and second male adaptors. The first male adaptor extends through a first opening in the housing. The first male adaptor comprises a proximal end adapted for receiving a first pipe and a distal end secured to the differential pressure sensor. The first male connector defines an internal fluid conduit for conveying fluid received from the first pipe to the differential pressure sensor. The second male adaptor extends through a second opening in the housing. The second male adaptor comprises a proximal end adapted for receiving a second pipe and a distal end secured to the differential pressure sensor. The second male connector defines an internal fluid conduit for conveying fluid received from the second pipe to the differential pressure sensor. The differential pressure sensor is configured to determine a pressure differential between fluid received via the first male adaptor and fluid received via the second male adaptor.

According to a third aspect, the present disclosure provides a system comprises a housing, a printed circuit board (PCB) located inside the housing, a differential pressure sensor located inside the housing, and first and second male adaptors. The first male adaptor extends through a first opening in the housing, and comprises a proximal end adapted for receiving a first pipe and a distal end secured to the differential pressure sensor. The first male adaptor defines an internal fluid conduit for conveying fluid received from the first pipe to the differential pressure sensor. The second male adaptor extends through a second opening in the housing. The second male adaptor comprises a proximal end adapted for receiving a second pipe and a distal end secured to the differential pressure sensor. The second male adaptor defines an internal fluid conduit for conveying fluid received from the second pipe to the differential pressure sensor. The differential pressure sensor is configured to determine a pressure differential between fluid received via the first male connector and fluid received via the second male connector.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

The following terminology is used throughout the present disclosure:

PCB: A Printed Circuit Board is used in electronics to build electronic devices. The PCB is a board for mounting electrical and/or electronic components, and for providing electrical connection between the components.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Various aspects of the present disclosure generally address one or more of the problems related to the positioning of a differential pressure sensor within a housing and connection thereof to a PCB within the housing.

Figure 1:
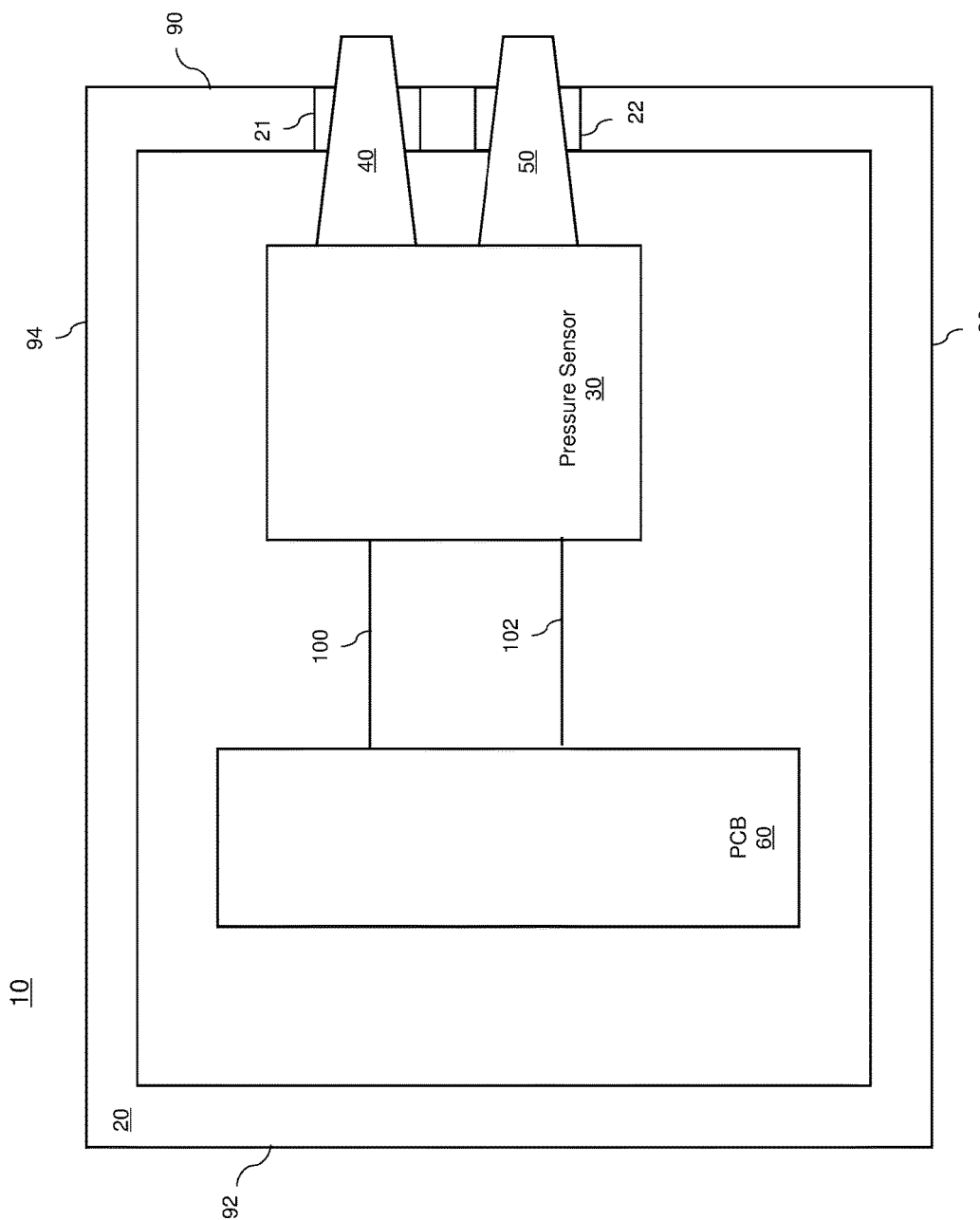
FIG. 1 represents a side elevation view of a system comprising a separated pressure sensor adapted for determining a pressure differential of a fluid coming from two different locations outside a housing.
Figure 2:
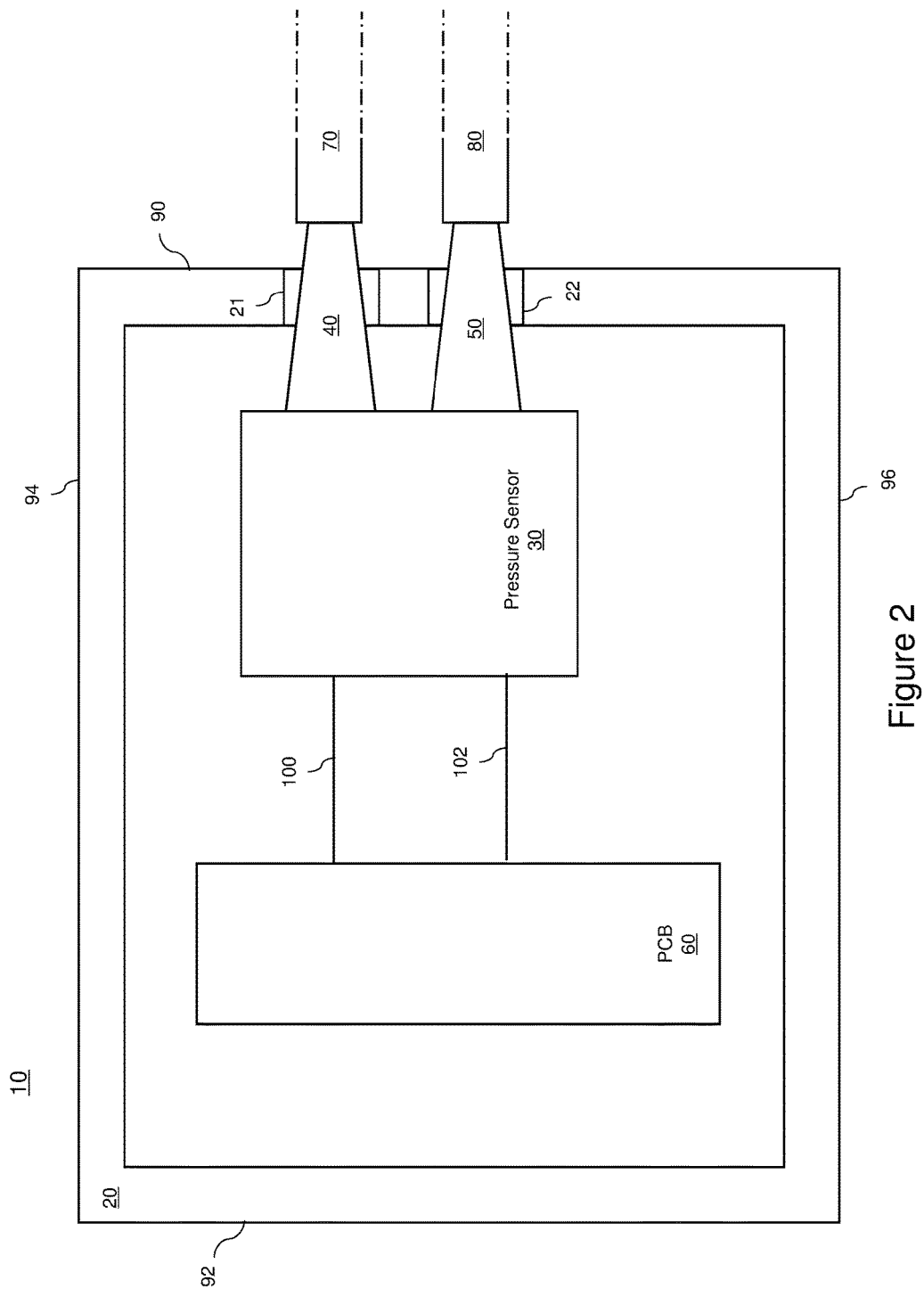
FIG. 2 represents a side elevation view of the system of FIG. 1 with two pipes extending outside of the housing to receive fluid.
Figure 3:
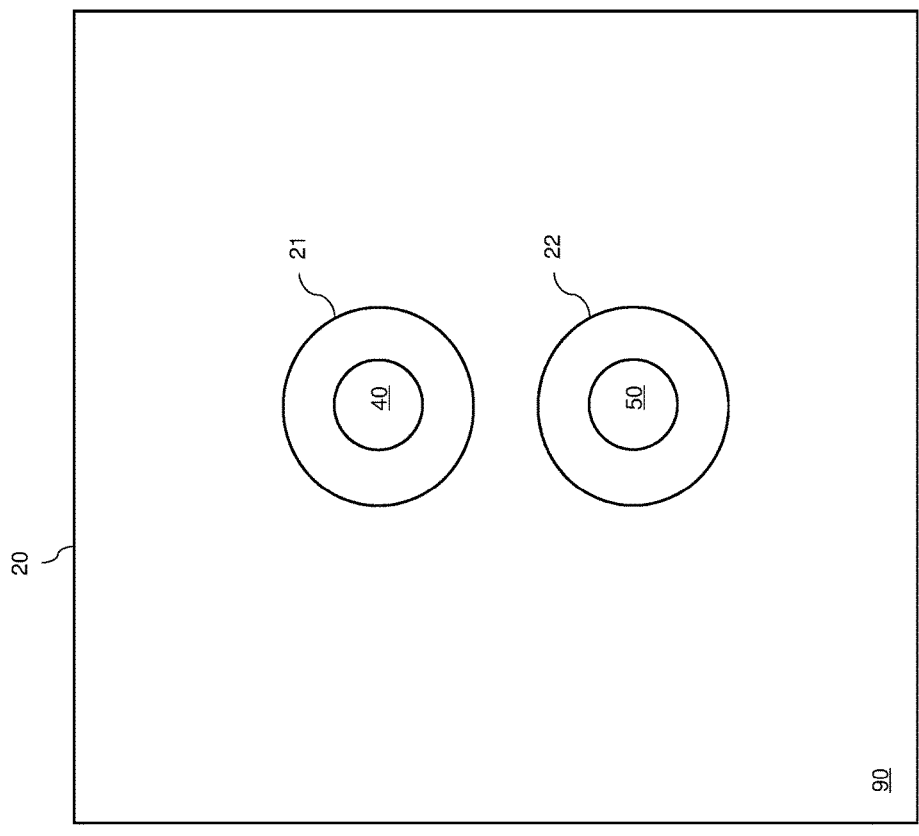
FIG. 3 represents a back elevation view of the system represented in FIG. 1.
Figure 4:
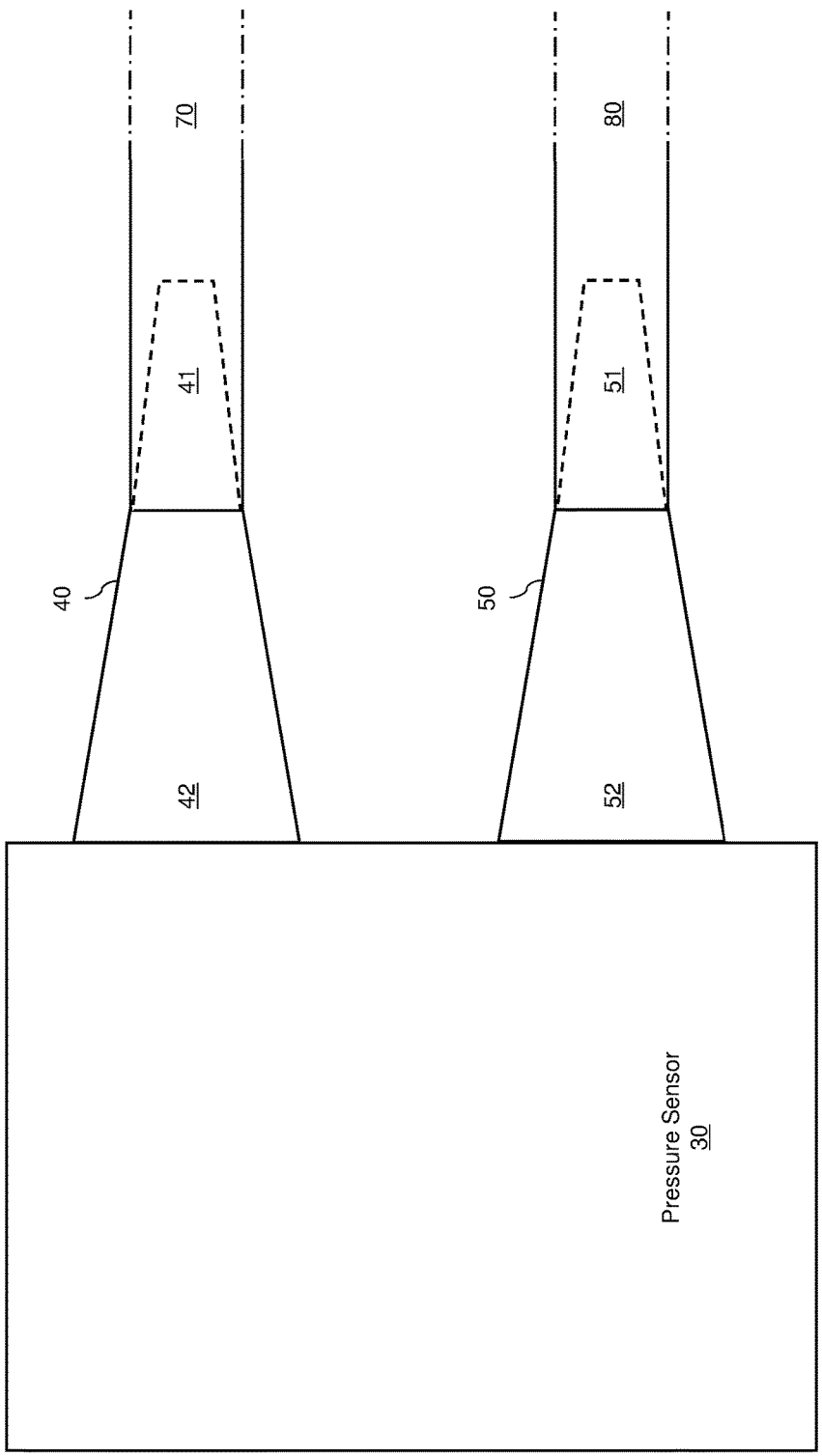
FIG. 4 represents two male connectors adapted for transmitting fluid from the pipes to the pressure sensor represented in FIG. 2.
Figure 5:
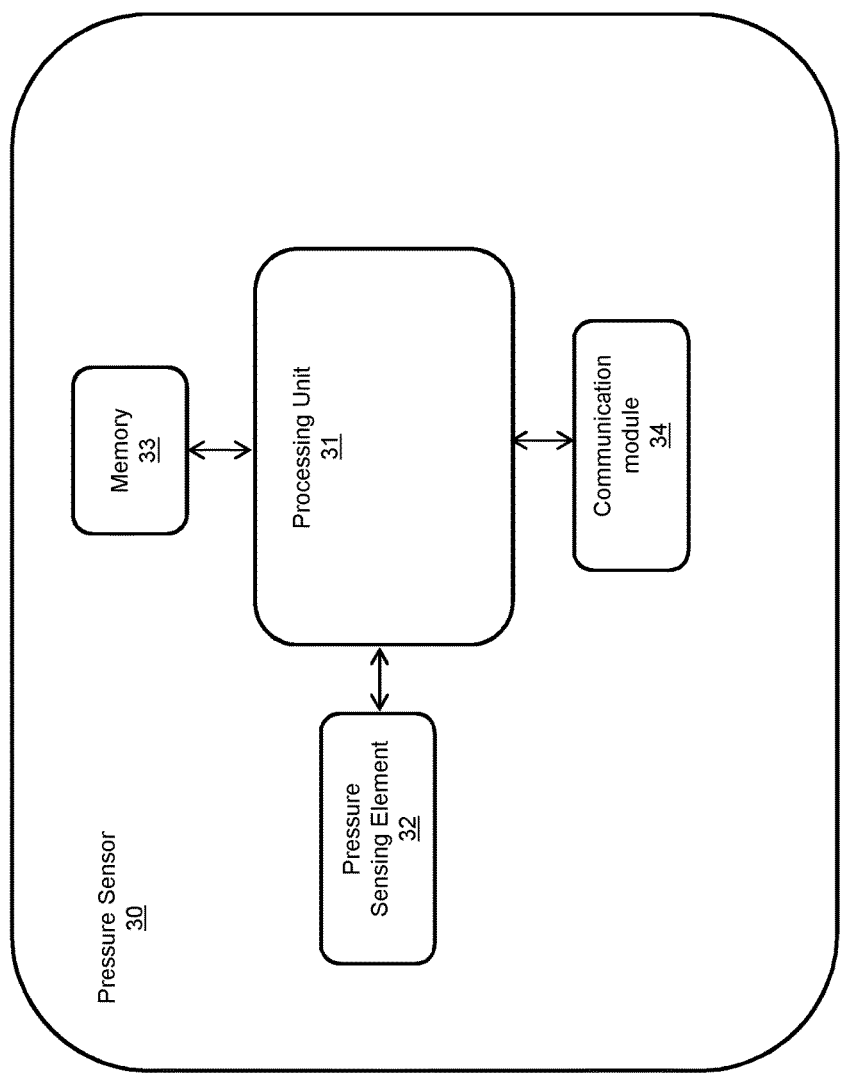
FIG. 5 is a schematic representation of components of the pressure sensor represented in FIG. 1.
Figure 6:
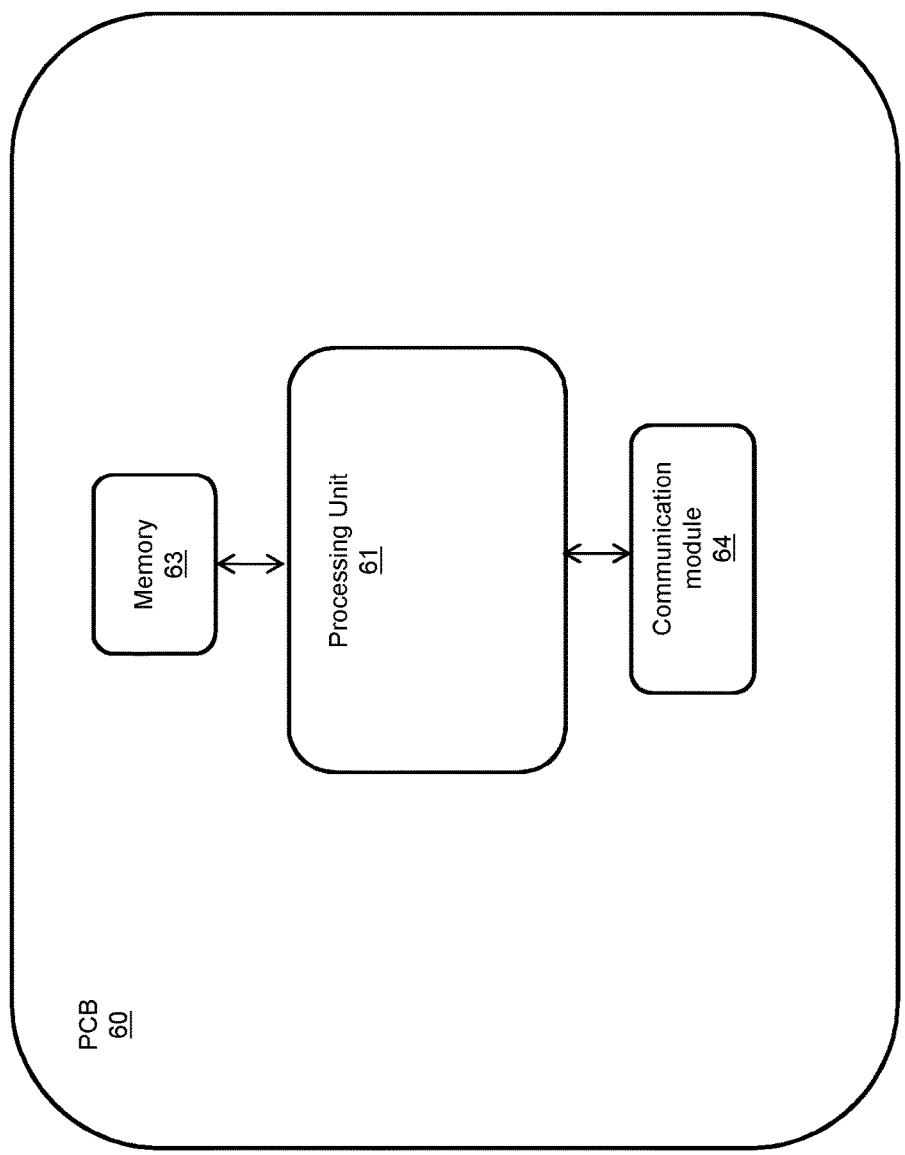
FIG. 6 is a schematic representation of components of a PCB included in the appliance represented in FIG. 1.

Referring now concurrently to FIGS. 1-4, a system 10 is represented. FIGS. 1 and 2 represent side elevation views of the system 10, while FIG. 3 represents a back elevation view of the system 10. FIG. 4 represents details of some components of the system 10.

The system 10 comprises a differential pressure sensor 30 and a PCB 60 both located inside a housing 20 of the system 10. The shape and size of the system 10 is adapted for receiving the PCB 60 and the differential pressure sensor 30 inside the housing 20. For illustration purposes only, the example of the system 10 represented in the FIGS. has sections having a substantially rectangular shape.

The PCB 60 supports a plurality of electrical and/or electronic components, such as one or more processing unit 61, one or more memory 63, an electrical power circuit (not represented in the FIGS for simplification purposes), etc. The pressure sensor 30 also supports a plurality of electrical and/or electronic components, such as a pressure sensing element 32, one or more processing unit 31, one or more memory 33, etc.

The housing 20 of the system 10 has a front panel 92 and a back panel 90. For illustration purposes, the PCB 60 is located in close vicinity of the front panel 92, and the differential pressure sensor 30 is located in close vicinity of the back panel 90 or on an upper panel 94 or a lower panel 96. The front panel 92 comprises one or more controls (e.g. one or more buttons, a touchscreen, etc. not represented in the FIGS.) for controlling electronic components hosted by the PCB 60 and/or for communication with other elements of an environmental control system (e.g. an HVAC system). For example, a touchscreen allows a user to control functionalities implemented by a processing unit of the PCB 60. As will be detailed later in the description, fluid received from two different locations is received from two pipes 70 and 80 (represented in FIG. 2) through two male connectors 40 and 50 passing through housing 20. Consequently, the differential pressure sensor 30 is located close or affixed to one of the panels (back panel 90, the upper panel 94 or the lower panel 96) for facilitating fluid transmission from outside the system 10 through the pipes 70 and 80 to the differential pressure sensor 30.

The differential pressure sensor 30 and the PCB 60 are secured to the housing 20 of the system 10 via proper means out of the scope of the present disclosure, and not represented in the FIGS. For example, the differential pressure sensor 30 is secured to at least one of the back panel 90, the upper panel 94 and the lower panel 96 of the housing 20. The PCB 60 is secured to at least one of the front panel 92, the upper panel 94 and the lower panel 96 of the housing 20.

The first male adaptor 40 extends through a first opening 21 in the housing 20. In the configuration illustrated in the FIGS., the first opening 21 is located in the back panel 90 of the housing 20, but the present system is not limited to such an implementation. For example, the first male adaptor 40 could alternately be located in the upper panel 94 or the lower panel 96. The first male adaptor 40 comprises a proximal end 41 adapted for receiving the first pipe 70, as illustrated in FIG. 4. The first male connector 40 comprises a distal end 42 secured to the differential pressure sensor 30. The first male adaptor 40 defines a fluid adaptor interfacing though the housing 20 for conveying fluid received from the first pipe 70 to the differential pressure sensor 30. The internal fluid conduit is not represented in FIG. 4, since a male adaptor with an internal fluid conduit is well known in the art.

The second male adaptor 50 extends through a second opening 22 in the housing 20. In the configuration illustrated in the FIGS., the second opening 22 is located in the back panel 90 of the housing 20, but the present system is not limited to such an implementation. For example, the second male adaptor 50 could alternately be located in the upper panel 94 or the lower panel 96. Furthermore, although shown as being contiguous on FIGS. 1 and 2 on the same panel, the first and second male connectors 40 and 50 could be affixed to different contiguous panels, so as to accommodate fluids coming from different locations or particular space constraints.

The second male adaptor 50 comprises a proximal end 51 adapted for receiving the second pipe 80, as illustrated in FIG. 4. The second male adaptor 50 comprises a distal end 52 secured to the pressure sensor 30. The second male adaptor 50 defines an internal fluid conduit for transmitting fluid received from the second pipe 80 to the differential pressure sensor 30. The internal fluid conduit is not represented in FIG. 4, since a male adaptor with an internal fluid conduit is well known in the art.

In the example illustrated in the FIGS., the differential pressure sensor 30 is located between the back panel 90 comprising the openings 21 and 22, and the PCB 60. Furthermore, the first and second male adaptors 40, 50 are aligned vertically. Alternatively, the first and second male adaptor 40, 50 are aligned horizontally.

The housing 20, the back panel 90 and the openings 21, 22 are not represented in FIG. 4 for simplification purposes. The proximal ends 41 and 51 of the male adaptors 40 and 50, as well as the pipes 70 and 80, are located outside of the housing 20. Thus, the pipes 70 and 80 are not engaged inside the openings 21 and 22. In an alternative example, the proximal ends 41 and 51 of the male adaptors 40 and 50, as well as the pipes 70 and 80, are at least partially engaged inside the housing 20 though the openings 21 and 22.

The shapes of the openings 21 and 22 in the housing 20 may vary, as well as the shapes of the male adaptors 40 and 50. For example, the openings 21 and 22 have a substantially cylindrical shape, as illustrated in FIGS. 2 and 3. Alternatively, the openings 21 and 22 may have a substantially conical shape (not represented in the FIGS.) complementary to a substantially conical shape of the male adaptors 40 and 50 (as illustrated in FIGS. 2 and 4), so that the male adaptors 40 and 50 can be firmly engaged inside the openings 21 and 22.

In a particular example, the male adaptors 40 and 50 are integral to the differential pressure sensor 30. In an alternative configuration, the male adaptors 40 and 50 are releasably connected to the differential pressure sensor 30 via connecting means well known in the art.

The differential pressure sensor 30 is adapted for determining a pressure differential between the fluid received via the first male adaptor 40 and the fluid received via the second male adaptor 50. The fluid may be any of the following: a gas, a liquid or a combination thereof. The pipes 70 and 80 may be any of the following: a flexible hose, a rigid hose, etc.

The system 10 comprises an electrical connector 100 (e.g. an electrical cable) between the PCB 60 and the differential pressure sensor 30 for transmitting electrical power from the PCB 60 to the differential pressure sensor 30.

The system 10 may also comprise a data transmission connector 102 (e.g. an electrical cable or an optical cable) between the PCB 60 and the differential pressure sensor 30 for transmitting data generated by the differential pressure sensor 30 from the differential pressure sensor 30 to a component (e.g. a processing unit 61) hosted by the PCB 60. Alternatively, the differential pressure sensor 30 comprises a wireless communication module 34 for wirelessly transmitting the data generated by the differential pressure sensor 30 to one or more other components. The one or more other components may be hosted by the PCB 60 (e.q. a wireless communication module 64), may be located within the system 10 but not hosted by the PCB 60, or may be located outside of the appliance 10.

In a particular example, the system 10 is an environment control appliance for controlling one or more controlled appliances dedicated to the regulation of the environment of a building. For example, the system 10 may be a Variable Air Volume (VAV) control appliance for controlling one or more heating, ventilating, and/or air-conditioning (HVAC) systems operating in a VAV mode.

The system 10 may comprise one or more other types of component (e.g. mechanical component, hydraulic component, electric component, electronic component, electro-mechanical component, etc.) inside the housing 20, in addition to the pressure sensor 30 and PCB 60. Alternatively, the system 10 does not include the PCB 60, but one or more other types of component instead.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system comprising:
  a housing;
  a differential pressure sensor located inside the housing and affixed to a panel of the housing;
  a printed circuit board (PCB) located inside the housing;
  a first male adaptor extending through a first opening in the housing, the first male adaptor comprising a proximal end adapted for receiving a first pipe and a distal end secured to the differential pressure sensor, the first male adaptor defining a fluid conduit internal to the first male adaptor for conveying fluid received from the first pipe to the differential pressure sensor;
  a second male adaptor extending through a second opening in the housing, the second male adaptor comprising a proximal end adapted for receiving a second pipe and a distal end secured to the differential pressure sensor, the second male adaptor defining a fluid conduit internal to the second male adaptor for conveying fluid received from the second pipe to the differential pressure sensor; and
  wherein the differential pressure sensor is configured to determine a pressure differential between fluid received via the first male adaptor and fluid received via the second male adaptor.

2. The system of claim 1, wherein the first and second male adaptors are integral to the pressure sensor.

3. The system of claim 1, wherein the first and second male adaptors are releasably connected to the differential pressure sensor.

4. The system of claim 1, wherein the fluid is one of: a gas, a liquid or a combination thereof.

5. The system of claim 1, wherein the first and second openings are located on the panel of the housing, and the differential pressure sensor is located between the panel and the PCB.

6. The system of claim 1 further comprising an electrical connector between the PCB and the differential pressure sensor for transmitting electrical power from the PCB to the differential pressure sensor.

7. The system of claim 1 further comprising a data transmission connector between the PCB and the differential pressure sensor for transmitting data generated by the differential pressure sensor from the pressure sensor to a component hosted by the PCB.

8. The system of claim 1 consisting of a Variable Air Volume (VAV) control system.

9. A system comprising:
  a housing;
  a printed circuit board (PCB) located inside the housing;
  a differential pressure sensor located inside the housing;
  a first male adaptor extending through a first opening in the housing, the first male adaptor comprising a proximal end adapted for receiving a first pipe and a distal end secured to the differential pressure sensor, the first male adaptor defining a fluid conduit internal to the first male adaptor for conveying fluid received from the first pipe to the differential pressure sensor;
  a second male adaptor extending through a second opening in the housing, the second male adaptor comprising a proximal end adapted for receiving a second pipe and a distal end secured to the differential pressure sensor, the second male adaptor defining a fluid conduit internal to the second male adaptor for conveying fluid received from the second pipe to the differential pressure sensor; and
  wherein the differential pressure sensor is configured to determine a pressure differential between fluid received via the first male connector and fluid received via the second male connector.

10. The system of claim 9, wherein the first and second male adaptors are integral to the differential pressure sensor.

11. The system of claim 9, wherein the first and second male adaptors are releasably connected to the differential pressure sensor.

12. The system of claim 9, wherein the fluid is one of the following: a gas, a liquid or a combination thereof.

13. The system of claim 9, wherein the first and second openings are located on a panel of the housing, and the differential pressure sensor is located between the panel and the PCB.

14. The system of claim 9 further comprising an electrical connector between the PCB and the differential pressure sensor for transmitting electrical power from the PCB to the differential pressure sensor.

15. The system of claim 9 further comprising a data transmission connector between the PCB and the differential pressure sensor for transmitting data generated by the differential pressure sensor from the differential pressure sensor to a component hosted by the PCB.

16. The system of claim 9 consisting of a Variable Air Volume (VAV) control system.

\* \* \* \* \*